US007953563B2

(12) United States Patent
Linn et al.

(10) Patent No.: US 7,953,563 B2
(45) Date of Patent: May 31, 2011

(54) DETERMINING EFFECTS OF TURBINE BLADES ON FLUID MOTION

(75) Inventors: Rodman Ray Linn, Los Alamos, NM (US); Eunmo Koo, Los Alamos, NM (US)

(73) Assignee: Los Alamos National Security, LLC, Los Alamos, NM (US)

(*) Notice: Subject to any disclaimer, the term of this patent is extended or adjusted under 35 U.S.C. 154(b) by 127 days.

(21) Appl. No.: 12/249,953

(22) Filed: Oct. 12, 2008

(65) Prior Publication Data

US 2010/0094567 A1 Apr. 15, 2010

(51) Int. Cl.
*G01F 23/00* (2006.01)
*G06F 19/00* (2006.01)

(52) U.S. Cl. ......................................................... 702/50
(58) Field of Classification Search ....................... 702/50
See application file for complete search history.

(56) References Cited

U.S. PATENT DOCUMENTS

| | | | | |
|---|---|---|---|---|
| 4,083,651 A | * | 4/1978 | Cheney et al. | 416/11 |
| 4,334,823 A | * | 6/1982 | Sharp | 416/119 |
| 4,764,090 A | * | 8/1988 | Danson | 416/17 |
| 5,181,678 A | * | 1/1993 | Widnall et al. | 244/219 |
| 6,068,446 A | * | 5/2000 | Tangler et al. | 416/223 R |
| 6,948,910 B2 | * | 9/2005 | Polacsek | 416/1 |
| 2007/0224029 A1 | * | 9/2007 | Yokoi | 415/4.2 |
| 2009/0123289 A1 | * | 5/2009 | Tangler et al. | 416/223 R |
| 2009/0129928 A1 | * | 5/2009 | Sauer et al. | 416/176 |
| 2010/0054936 A1 | * | 3/2010 | Sneeringer | 416/1 |

OTHER PUBLICATIONS

Qiu et al., "Three-Dimensional Flow Simulation for Horizontal Axis Wind Turbine", 2009, IEEE, pp. 1-5.*

* cited by examiner

*Primary Examiner* — Cindy Hien-Dieu Khuu
(74) *Attorney, Agent, or Firm* — Alexander J. Neudeck; Samuel M. Freund; Cochran Freund & Young LLC (57) ABSTRACT

Disclosed is a technique for simulating wind interaction with wind turbines. A turbine blade is divided into radial sections. The effect that each of these radial sections has on the velocities in Eulerian computational cells they overlap is determined. The effect is determined using Lagrangian techniques such that the calculations need not include wind components in the radial direction. A force on each radial section of turbine blade is determined. This force depends on the axial and azimuthal components of the fluid flow in the computational cell and the geometric properties of the turbine blade. The force on the turbine blade is fed back to effect the fluid flow in the computational cell for the next time step.

6 Claims, 7 Drawing Sheets

INTEGRATE AXIAL COMPONENT OF FORCE VECTORS OVER PLURALITY OF RADIAL SECTIONS TO DETERMINE A THRUST FOR THE TURBINE BLADE
602

INTEGRATE AZIMUTHAL COMPONENT OF FORCE VECTORS OVER PLURALITY OF RADIAL SECTIONS TO DETERMINE A TORQUE FOR THE TURBINE BLADE
604

DETERMINING EFFECTS OF TURBINE BLADES ON FLUID MOTION

STATEMENT REGARDING FEDERAL RIGHTS

This invention was made with government support under Contract No. DE-AC52-06NA25396 awarded by the U.S. Department of Energy. The government has certain rights in the invention.

BACKGROUND OF THE INVENTION

Wind is a vast resource for clean and renewable energy. Development of wind as a source of electrical power helps reduce $CO_2$ emissions produced by the generation of electricity. To generate electricity from wind, large wind turbines are used to convert the kinetic energy of the wind into electricity. As a wind turbine extracts energy from the wind, the air slows down and the nature of the wind field is modified. Thus, the kinetic energy of the higher speed wind is transferred to the wind turbine resulting in slower speed wind.

Commercial production of electric power from wind is typically produced in wind farms. These wind farms may consist of a few dozen to a hundred or more wind turbines. The wind turbines in a wind farm may be distributed over many hundreds of square kilometers. The wind turbines in a wind farm may also share a power collection and communication network.

SUMMARY OF THE INVENTION

An embodiment of the invention may therefore comprise a method of determining an effect of a turbine blade on gases in a computational cell, comprising: determining a radial section of said turbine blade that lies within said computational cell; determining an initial flow vector at a beginning of a time step; determining a force vector evolved over a duration of said time step on said radial section based on said initial flow vector; and, based on said force vector, determining an evolved flow vector.

An embodiment of the invention may therefore further comprise a method of determining an effect of a turbine blade on a plurality of Eulerian computational cells, comprising: dividing said turbine blade into a plurality of radial sections; determining a moving subset of said plurality of Eulerian computational cells, wherein each cell of said moving subset includes at least a portion of one of said plurality of radial sections; determining which of said plurality of radial sections is included in each of said moving subset; based on an initial flow vector for a first cell of said moving subset, and a property of a first radial section that is included in said first cell, determining a force vector; and, based on said force vector, determining an evolved flow vector for said first cell after a duration of a time step.

An embodiment of the invention may therefore further comprise a computer readable medium having instructions stored thereon for determining an effect of a turbine blade on a plurality of Eulerian computational cells that, when executed by a computer, at least instruct the computer to: divide said turbine blade into a plurality of radial sections; determine a moving subset of said plurality of computational cells, wherein each cell of said moving subset includes at least a portion of one of said plurality of radial sections; determine which of said plurality of radial sections is included in each of said moving subset; based on an initial flow vector for a first cell of said moving subset, and a property of a first radial section that is included in said first cell, determine a force vector; and, based on said force vector, determine an evolved flow vector for said first cell.

DETAILED DESCRIPTION OF THE EMBODIMENTS

In an embodiment, the effect a moving turbine blade has on the velocities of gases in a grid (or mesh) of computational fluid dynamics (CFD) computation cells, and visa versa, is determined. The turbine blades of a wind turbine are divided into a certain number of elements that may each have the same width. As the turbine blade rotates in a simulation, these elements pass through the field of computation cells. At each time step of the simulation, the effect of each element on the flow field in the computation cell that all or a portion of that element resides in is calculated. The forces that the flow field puts on the elements of the blade is calculated as well. As the time steps of the simulation progress, the elements of the turbine blade pass through different computation cells.

Figure 1:
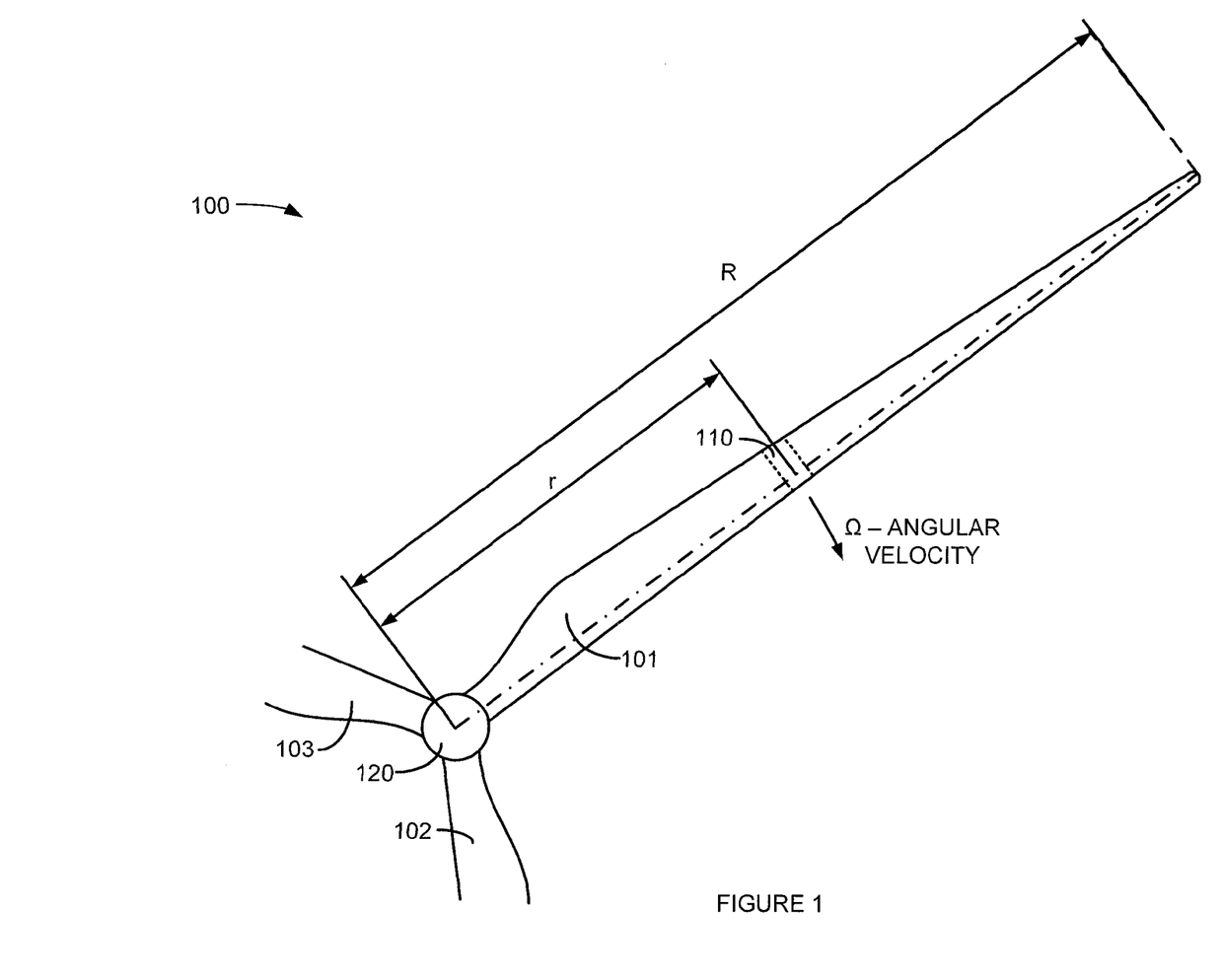
FIG. 1 is an illustration of a radial section of a turbine blade.

FIG. 1 is an illustration of a radial section of a turbine blade. In FIG. 1, wind turbine 100 is illustrated with turbine blades 101-103 connected to, and rotating around, hub 120. Turbine blade 101 is shown with a length R. A radial section 110 of turbine blade 101 is also illustrated. The approximate midpoint of radial section 110 lies at a distance r from the center of hub 120. Radial section 110 is moving at an angular velocity of $\Omega$ in the clockwise direction.

Figure 2:
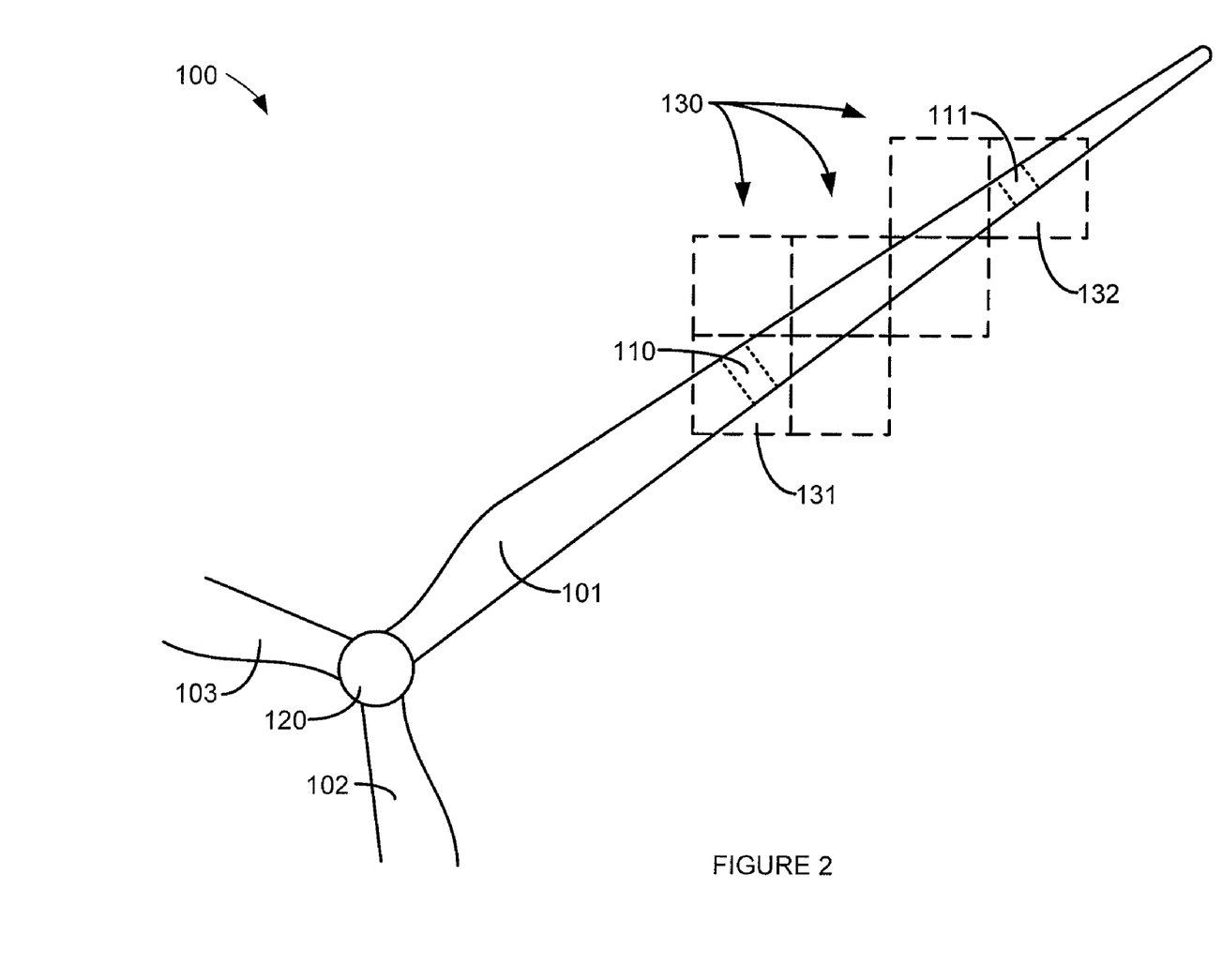
FIG. 2 is a two-dimensional representation of three-dimensional Eulerian computation cells that include a radial section of a turbine blade.

FIG. 2 is a two-dimensional representation of three-dimensional Eulerian computation cells that include a radial section of a turbine blade. In FIG. 2, like FIG. 1, wind turbine 100 is illustrated with turbine blades 101-103 connected to, and rotating around, hub 120. FIG. 2 also includes a plurality of computational cells 130. FIG. 2 shows radial section 110 included in computational cell 131. A different radial section 111 is shown in computational cell 132.

Computational cells 130 represent a discretization of the spatial domain into small cells to form a volume mesh or grid. This technique of discretization of space is common among computational fluid dynamics (CFD) techniques and programs. Each computational cell 130 represents a physical volume of space being simulated by the CFD tool.

Computational cells 130 are shown as two-dimensional squares in FIG. 2. However, it should be understood that computational cells 130 typically represent three-dimensional volumes. In addition, computational cells 130 may represent irregular shapes such as triangles and pyramids instead of squares and cubes. Once a space is discretized, a CFD program may simulate fluid flows and behavior in that space by iteratively solving various equations of fluid motion across the computational cells 130 at discrete time steps.

Figure 3:
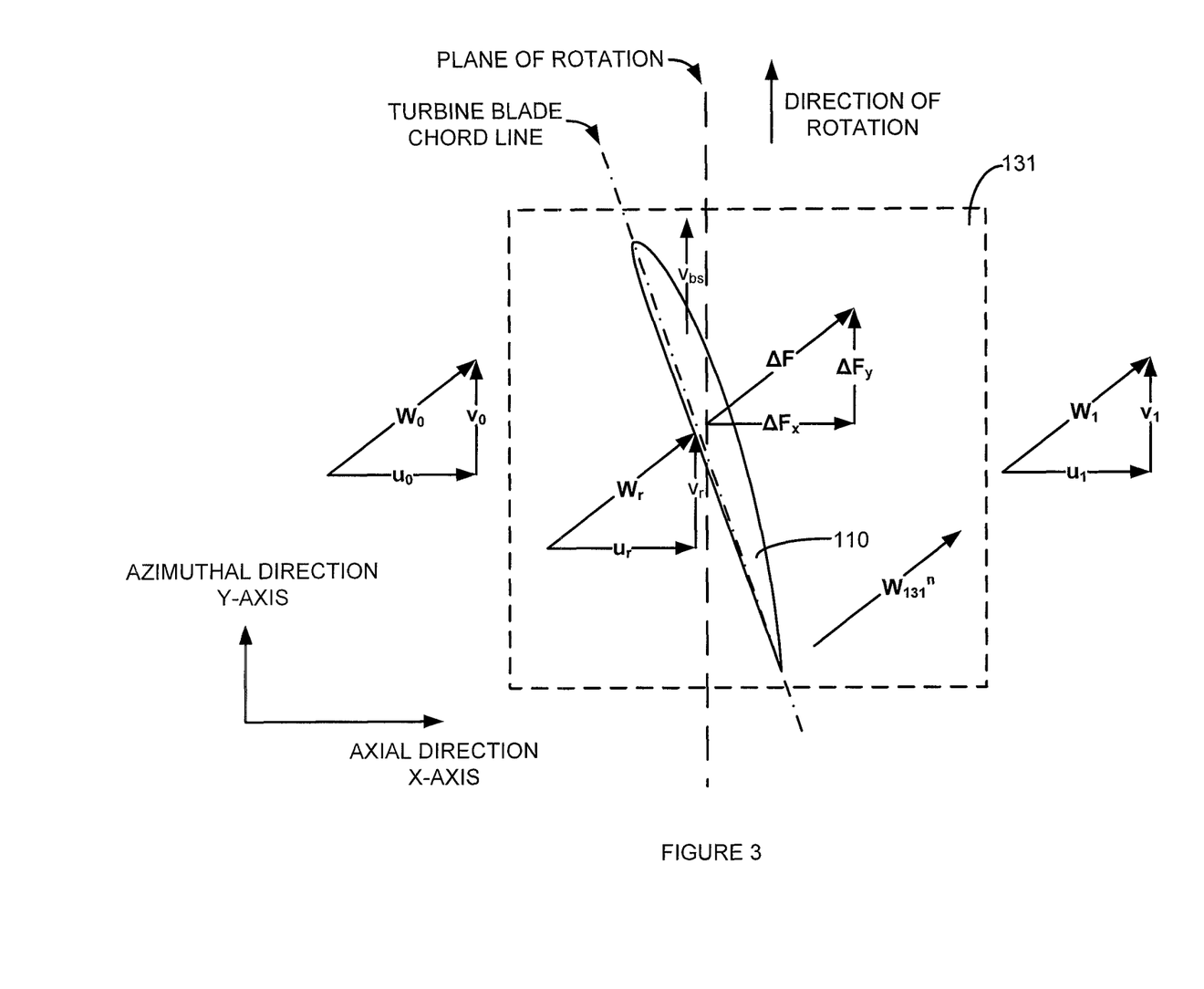
FIG. 3 is an illustration of a cross-section of a turbine blade included in a Eulerian computational cell.

FIG. 3 is an illustration of a cross-section of a turbine blade included in a Eulerian computational cell. FIG. 3 illustrates radial section 110 inside of computational cell 131. Thus, FIG. 3 illustrates what is shown if FIG. 2, except FIG. 3 is from a perspective view along a line running from the tip of the turbine blade to the center of hub 120.

FIG. 3 also illustrates a coordinate system for the following discussion. That coordinate system defines the azimuthal direction (or y-axis) as running vertically in FIG. 3. In this illustration, this direction is also parallel to the plane of rotation of turbine blade 110. It should be understood that this is for illustration purposes and that it is not necessary to have the y-axis parallel to the plane of rotation of turbine blade 110. The axial direction (or x-axis) is shown in FIG. 3 as running horizontally. A third axis (not shown) is the radial direction which would be out of the page at a right angle to both the x-axis and y-axis. If the Eulerian grid is not aligned with the x, y, and radial directions of these axis, then a simple coordinate transformation can translate velocities and forces back and forth from turbine axis, shown in FIG. 3, to Eulerian grid coordinates. In this way the formulation described herein is independent of the details of the Eulerian grid.

An upwind flow vector ($W_0$), and its axial and azimuthal components ($u_0$ and $v_0$, respectively) is shown to the left of computational cell 131. A relative flow vector ($W_r$) that corresponds to the wind relative to the motion of the blade, and its axial and azimuthal components ($u_r$ and $v_r$, respectively) is shown to the inside of computational cell 131. The flow of the wind relative to the blade is defined as the difference between the absolute wind velocity ($W_0$) and the blade segment velocity ($v_{bs}$). A downwind flow vector ($W_1$), and its axial and azimuthal components ($u_1$ and $v_1$, respectively) is shown to the right of computational cell 131. There are also flows on the other sides of the cell as well, but for this description the left and right flows are described for demonstration purposes. There is average flow vector ($W_{131}{}^n$) that represents the mass weighted average of the flow within the computational cell at time step n. A force vector ($\Delta F$), and its axial and azimuthal components ($\Delta F_x$ and $\Delta F_y$, respectively) are shown inside of computational cell 131.

Force vector $\Delta F$ represents the force on turbine blade 101 attributable to radial section 110 from the flow inside of computational cell 131 ($W_{131}{}^n$). According to Newton's Second Law, the forces represented by force vector $\Delta F$ are accompanied by a force of equal magnitude but opposite direction put on the fluid represented by computational cell 131 ($W_{131}{}^n$) by the turbine blade section 110. This results in an acceleration (positive or negative rate of change in velocity) of the flow within computational cell 131. It is assumed that the same force $\Delta F$ is present over some short time span or time step ($\Delta t$ or dt). This assumption allows for the determination of the change in the flow vector $W_{131}$ over the length of the time step and calculate a new mass weighted average flow vector in cell 131 at time n+1 ($W_{131}{}^{n+1}$). The calculation of $W_{131}{}^{n+1}$ also included the impacts of the other forces put on the gases in the flow field such as gravity and external pressure forces, but those are captured by the basic CFD model. This calculation of $W_{131}{}^{n+1}$ can be accomplished through explicit or implicit numerical CFD schemes. Once the changes in flow fields in surrounding computational cells are calculated the new upwind and downwind velocities can be calculated as well. The difference between the upwind and downwind fluid flow ($W_0$ and $W_1$) across computational cell 131 may be referred to as a blade segment wake. The combination of these differences for all segments of the turbine blades as well as their effects as they are carried downstream of the turbine is commonly called the turbine wake.

The initial fluid flow vector $W_{131}{}^n$ associated with computational cell 131 will be affected by the fluid flow entering or exiting adjacent computational cells and external or body forces applied to the flow field. In another embodiment, initial fluid flow vector $W_{131}{}^n$ associated with computational cell 131 may be the updated fluid flow inside computational cell 131 from a previous time step. The updated or evolved fluid flow vector $W_{131}{}^{n+1}$ exiting computational cell 131 is determined by the initial flow vector $W_{131}{}^n$ and the sum of all of the forces acting on it including its interaction with radial section 110. These interactions are affected by the angular velocity $\Omega$ and the geometrical properties of radial section 110. The geometrical properties of radial section 110 may include, but are not limited to, the shape of the radial section 110 which has an associated coefficient of lift and the coefficient of drag, radial distance r and direction from hub 120, the angle between the plane of rotation and the turbine blade chord ($\beta$), the angle between the plane of rotation and the projection of the initial flow vector, $W_{131}{}^n$ on the x-y plane ($\phi$), and the angle between the turbine blade chord and the projection of the initial flow vector, $W_{131}{}^n$, on the x-y plane. Alpha ($\alpha$) is also known as the angle of attack.

To determine the force vector $\Delta F$ for an iterative time step, it is first assumed that effect of the fluid flow in the radial direction has either no effect on the force vector or that its effect has been accounted for in previous corrections to the lift and drag coefficients associated with the radial section 110. It is also assumed, for simplicity, for all the force calculations, the radial component of the force vectors is taken to be zero. The evolution of the radial component of the initial flow vector, $W_{131}{}^n$ into the radial component of the evolved flow vector $W_{131}{}^{n+1}$ is assumed to be unaffected by the direct interaction with the blade. However, other forces in the flow field including secondary effects of the blade may accelerate the flow in a radial direction.

The relative velocity at time step n of radial section 110 in the azimuthal direction is calculated as: $v_r = v_0{}^n - \Omega r$ and the relative velocity in the axial direction is the same as the x-component of the flow vector because the blade is defined as being in the plane perpendicular to the x-direction. (Note, in FIG. 3, the direction of rotation is taken to be a positive number for rotation in the positive azimuthal direction.) Thus the relative wind vector experienced by radial section 110 is $W_r = W_{131}{}^n - v_{bs}$. The magnitude of relative wind velocity experienced by radial section 110 is determined by:

$$W_r = \sqrt{(u^n)^2 + (v_r{}^n)^2}.$$

The use of the initial velocities for the time step is used in the context of an explicit CFD calculation, but it is also possible to solve the calculation with a fully implicit solution of the Navier-Stokes equation by using:

$$W_r = \sqrt{(u^{n+1})^2 + (v_r{}^{n+1})^2}.$$

The drag force vector ($\Delta D$) associated with radial section 110, which is in the direction parallel to $W_r$ is determined by:

$$\Delta D = \frac{1}{2} \rho W_r^2 C_D A$$

where: $\rho$ is the density of air; $C_D$ is the coefficient of drag for radial section 110; and A is the area of radial section 110. The area of radial section 110 (A) is defined as the length of the chord line intersecting radial section 110 and the radial width of radial section 110. The lift force vector (ΔL), which is in the direction perpendicular to $W_r$ and the radial direction is determined by:

$$\Delta L = \frac{1}{2}\rho W_r^2 C_L A$$

where $C_L$ is the coefficient of lift for radial section 110. $C_D$ and $C_L$ are functions of the angle of attack, α.

The axial component of force vector $\Delta F_x$ is determined by:

$$\Delta F_x = \Delta L \cos\phi - \Delta D \sin\phi.$$

The azimuthal component of force vector $\Delta F_y$ is determined by:

$$\Delta F_y = \Delta L \sin\phi - \Delta D \cos\phi.$$

By applying Newton's Second Law using these forces acting on the volume of fluid represented by computational cell 131, the evolution of the axial and azimuthal components of the fluid flow vector $W_{131}^{n+1}$ due to the blade section 110 may be determined as:

$$u^{n+1} = u^n - [\Delta F_x - (\text{other forces in } x \text{ direction})]\frac{dt}{m}$$

and $$v^{n+1} = v^n - [\Delta F_y - (\text{other forces in } y \text{ direction})]\frac{dt}{m}$$

where m is the mass of the air in the computational cell 131 and dt is the incremental amount of time in a simulation time step. The other forces in the x and y direction are those imparted by the flow field or other drivers that are not pertinent to this disclosure except that these forces are integrated along with the turbine forces to modify the entire velocity field through the descretization of the Navier-Stokes equation. This process is essentially performed with CFD model through the addition of the lift and drag as body forces in computational cell 131. Thus, a new or evolved flow vector $W_{131}^{n+1}$ may be determined from these calculations of $u^{n+1}$, $v^{n+1}$, from the flow vectors in cell 131 $W_{131}^n$, and surrounding cells determined previously.

Figure 4:
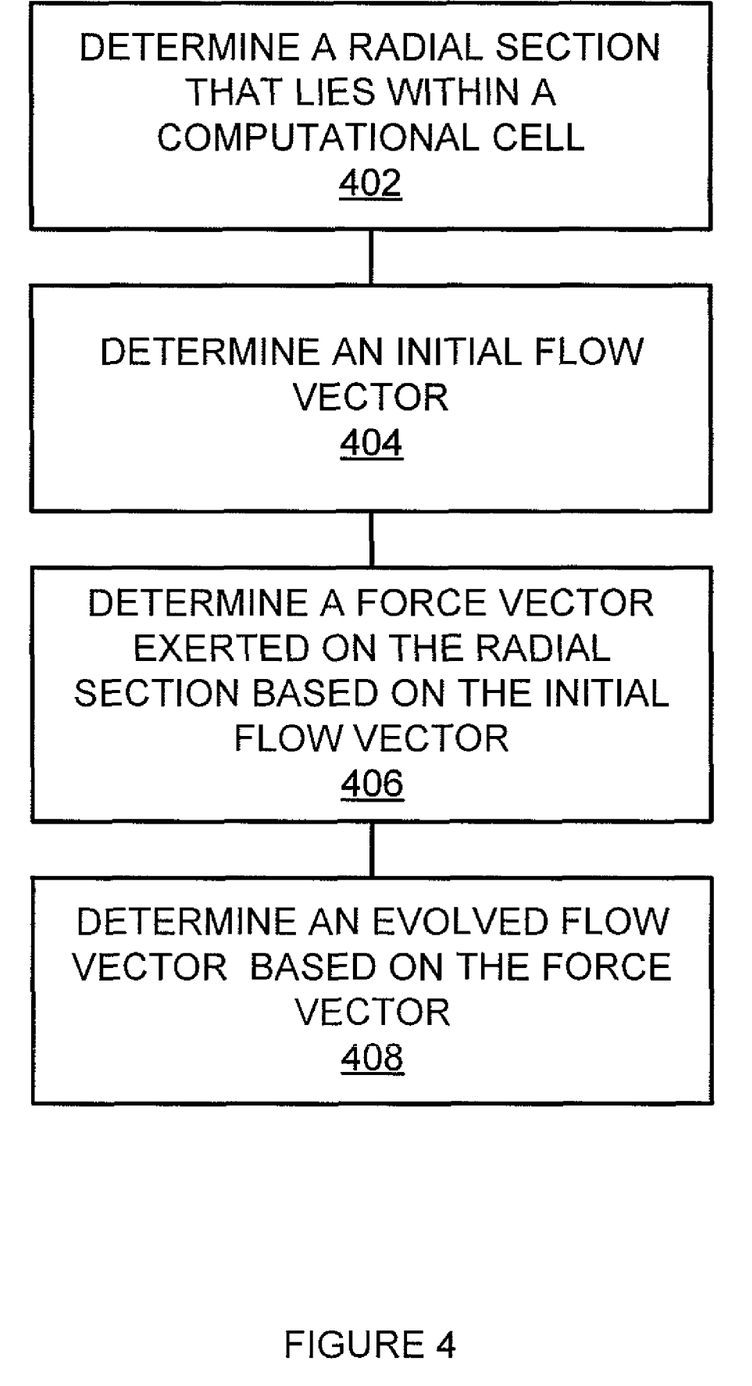
FIG. 4 is a flowchart illustrating a method of determining an effect of a turbine blade in a computational cell.

FIG. 4 is a flowchart illustrating a method of determining an effect of a turbine blade in a computational cell. A radial section that lies within a computational cell is determined (402). For example, it may be determined that radial section 110 of turbine blade 101 lies partially, or entirely, within computational cell 131. An initial flow vector is determined (404). This initial flow vector may be determined through the solution of the Navier-Stokes and conservation of mass and energy equations at the previous time step. If a radial blade segment was present in computational cell 131 in the previous time step it would have affected the flow in the previous time step as well.

Based on the initial flow vector, a force vector exerted on the radial section is determined (406). This may be repeated for each time step. Assuming the use of an explicit CFD calculation, the force vector corresponds to the turbine induced force. For example, the lift and drag forces on radial section 110 may be determined from the flow vector that was evolved from the forces of the previous time step. Based on the force vector and the other forces calculated by the CFD calculations, an evolved flow vector is determined (408). This evolved flow vector may be used to represent the flow at the end of the time step.

Figure 5:
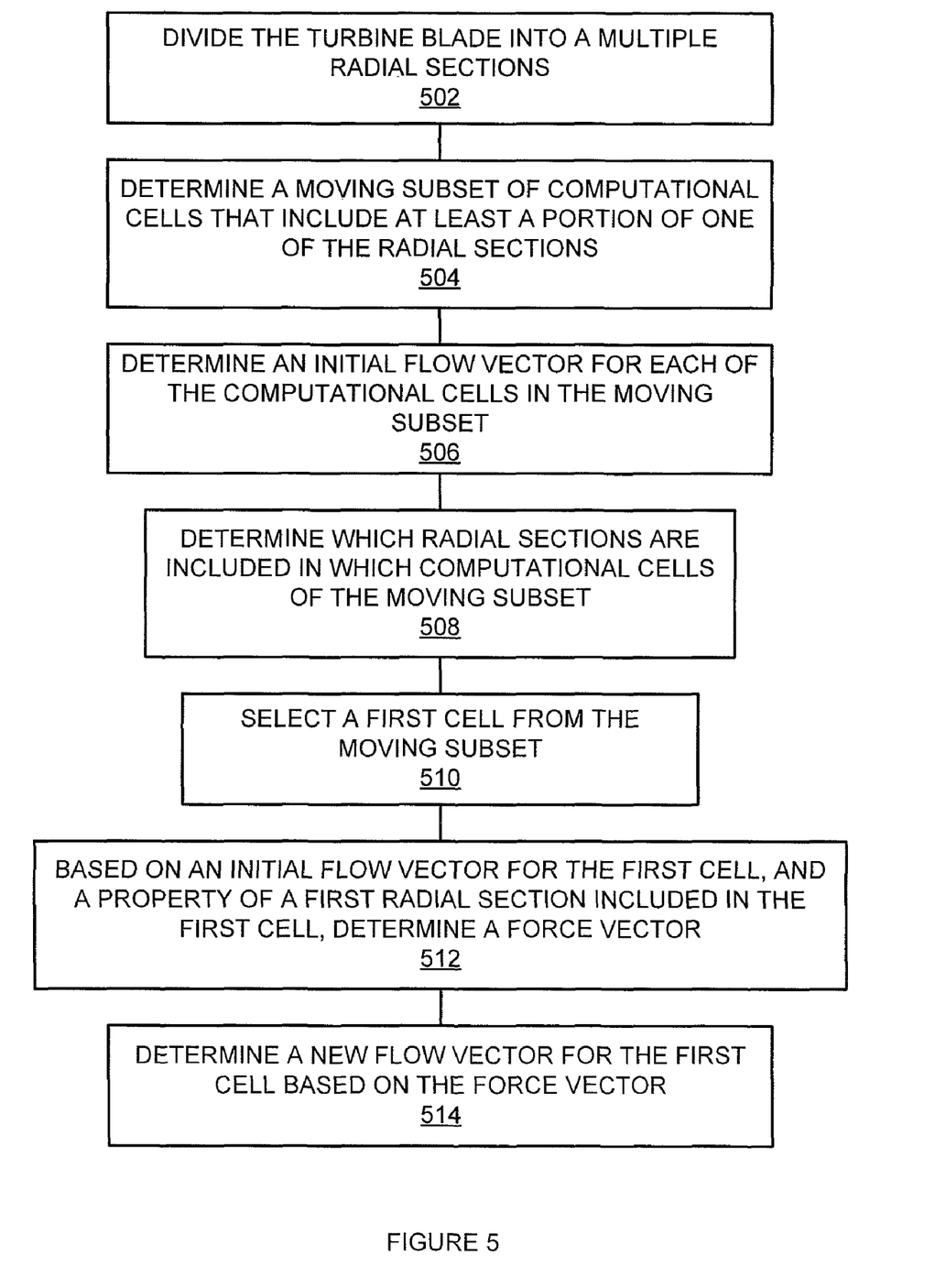
FIG. 5 is a flowchart illustrating a method of determining an effect of a turbine blade on a plurality of Eulerian computational cells.

FIG. 5 is a flowchart illustrating a method of determining an effect of a turbine blade on a plurality of Eulerian computational cells. The turbine blade is divided into multiple radial sections (502). For example, turbine blade 101 may be divided into multiple radial sections along a radial axis, such as radial section 110 and radial section 111, that collectively make up a model of the turbine blade. A moving subset of computational cells that include at least a portion of one of the radial sections is determined (504). For example, computational cells 130 may be determined to each include at least a portion of turbine blade 101 and thus a portion of one or more of the radial sections created in block 502. The subset of computational cells is a subset of all the computational cells being simulated in that it does not include those computational cells that don't, at this time step of the simulation, include at least a portion of a turbine blade 101. The subset is moving in that from time step to time step, the members of the subset may change as turbine blade 101 rotates around hub 120.

An initial flow vector is determined for each of the computational cells in the moving subset (506). For example, an initial flow vector for computational cells 130 may be determined in a manner discussed previously as a result of forces acting on air in that cell in earlier time steps and the velocities of the air carried into that cell. Which radial sections are included in which computational cells of the moving subset is determined (508). For example, it may be determined that radial section 110 is included in computational cell 131 and radial section 111 is included in computational cell 132.

A first cell is selected from the moving subset (510). For example, computational cell 131 may be selected for determination of the effect that radial section 110 will have on that cell. Based on an initial flow vector for the first cell, and properties of a first radial section included in the first cell, a force vector is determined (512). For example, based on an initial flow vector for computational cell 131, and the coefficient of lift and drag for radial section 110, a force vector acting on radial section 110 may be determined. This determination may be accomplished in the manner discussed previously. The flow vector for the first cell is determined based on the force vector (514). The flow vector may be evolved to find a flow vector at the end of the time step by combining the force vector contributions from all radial blade segments in the first cell as well as the other hydrodynamic forces computed by the CFD calculation. For example, the fluid flow vector for computational cell 131 may be affected by the force vector determined in block 514. This evolved fluid flow vector may be determined in the manner discussed previously through the integration of the forces acting on the fluid in the cell. This may include the negative of the force that the flow field puts on the blade segments.

Figure 6:
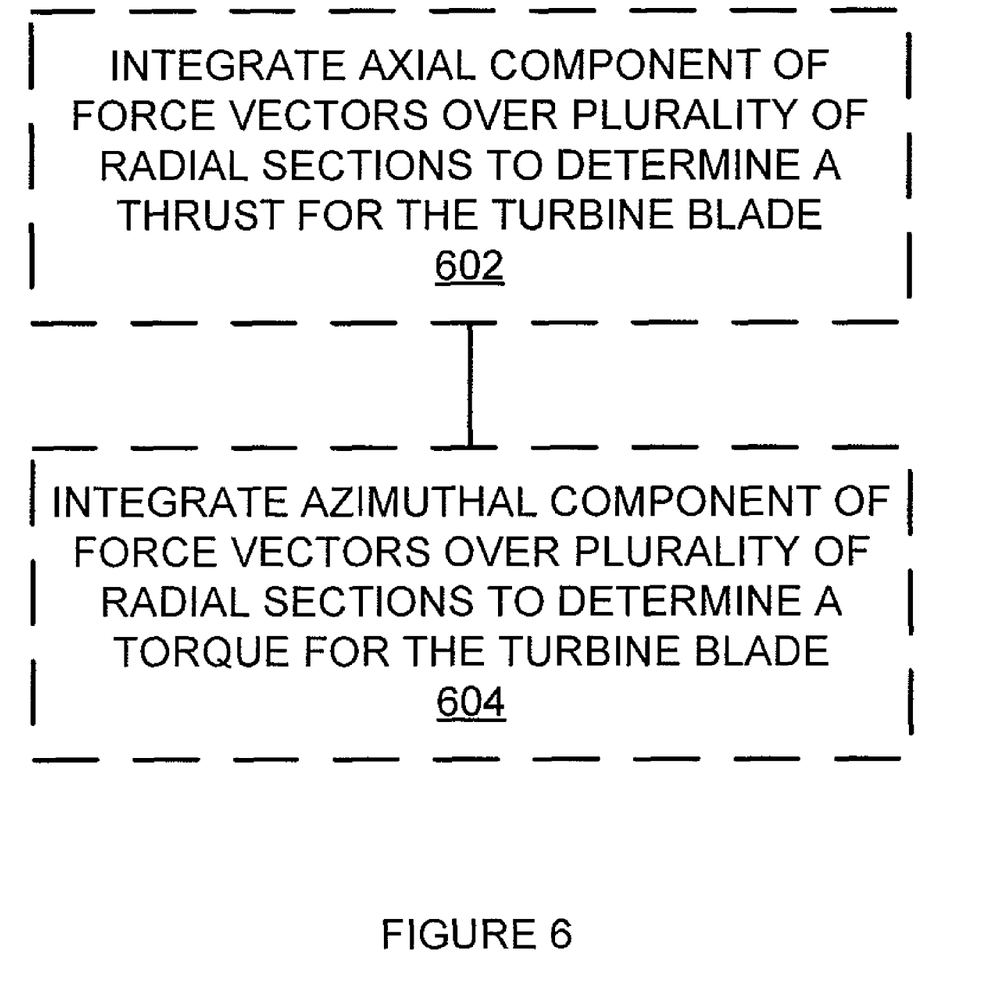
FIG. 6 is a flowchart illustrating a method of determining a thrust and torque associated with a turbine blade.

FIG. 6 is a flowchart illustrating a method of determining a thrust and torque associated with a turbine blade. The steps in FIG. 6 are shown outlined in dashed lines to indicate that each step is optional. A step shown in FIG. 6 may be performed without performing the other step, and visa versa.

The axial components of the force vectors are integrated over a plurality of radial sections to determine a thrust for the turbine blade. For example, the radial sections that comprise turbine blade 101 (such as radial sections 110 and 111) may be each associated with force vectors calculated during a time step. The axial components of these force vectors (e.g., $\Delta F_x$) may be integrated over the many radial sections that make up turbine blade 101 to determine a thrust associated with turbine blade 101 and the same for the other blades.

The azimuthal components of the force vectors are integrated over a plurality of radial sections to determine a torque for the turbine blade. For example, the radial sections that comprise turbine blade 101 (such as radial sections 110 and 111) may be each associated with a force vector calculated during a time step. The azimuthal components of these force vectors (e.g., $\Delta F_y$) may be integrated over the many radial sections that make up turbine blade 101 to determine a torque associated with turbine blade 101 and the same for the other blades.

The methods, systems, tools, simulations, computational cells, and programs described above may be implemented with or executed by one or more computer systems. The methods described above may also be stored on a computer readable medium.

Figure 7:
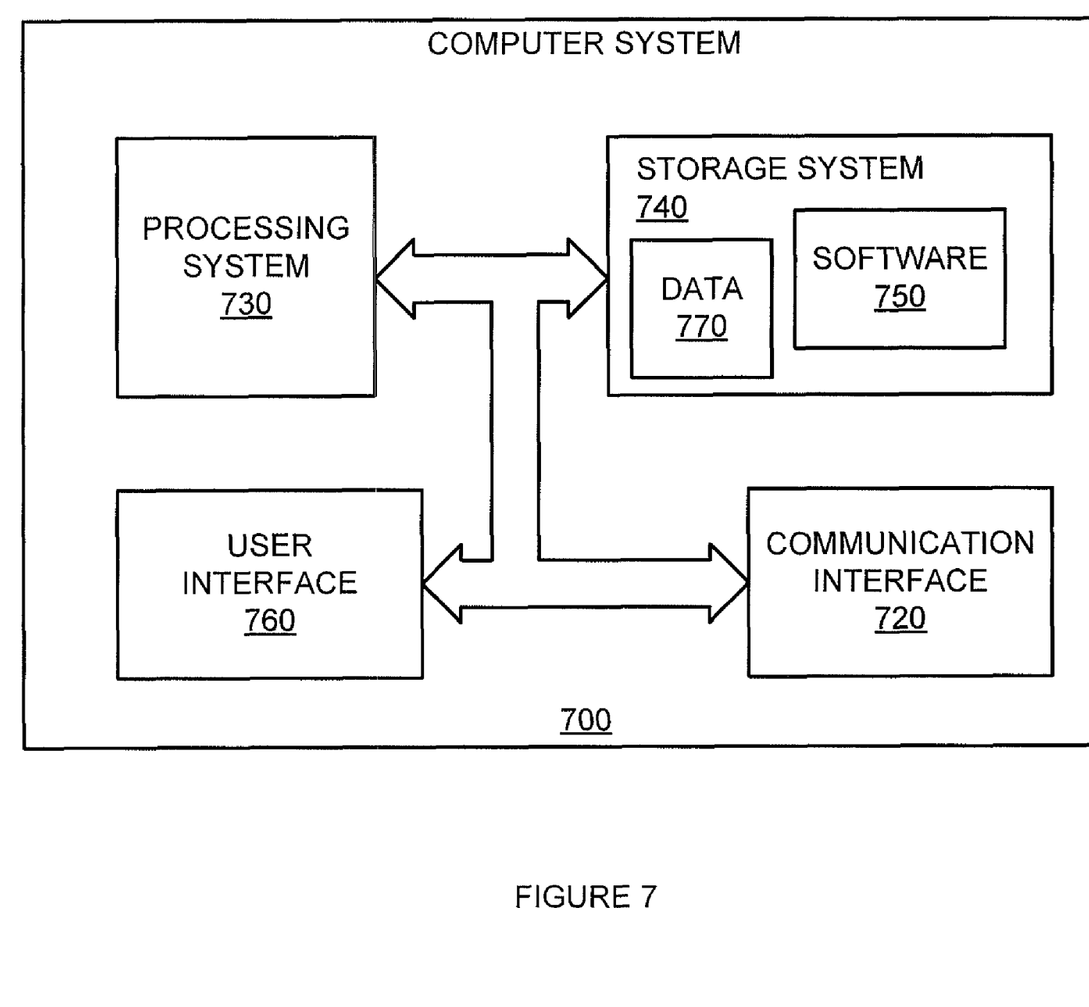
FIG. 7 is a block diagram of a computer system.

FIG. 7 illustrates a block diagram of a computer system. Computer system 700 includes communication interface 720, processing system 730, storage system 740, and user interface 760. Processing system 730 is operatively coupled to storage system 740. Storage system 740 stores software 750 and data 770. Processing system 730 is operatively coupled to communication interface 720 and user interface 760. Computer system 700 may comprise a programmed general-purpose computer. Computer system 700 may include a microprocessor. Computer system 700 may comprise programmable or special purpose circuitry. Computer system 700 may be distributed among multiple devices, processors, storage, and/or interfaces that together comprise elements 720-770.

Communication interface 720 may comprise a network interface, modem, port, bus, link, transceiver, or other communication device. Communication interface 720 may be distributed among multiple communication devices. Processing system 730 may comprise a microprocessor, microcontroller, logic circuit, or other processing device. Processing system 730 may be distributed among multiple processing devices. User interface 760 may comprise a keyboard, mouse, voice recognition interface, microphone and speakers, graphical display, touch screen, or other type of user interface device. User interface 760 may be distributed among multiple interface devices. Storage system 740 may comprise a disk, tape, integrated circuit, RAM, ROM, network storage, server, or other memory function. Storage system 740 may be a computer readable medium. Storage system 740 may be distributed among multiple memory devices.

Processing system 730 retrieves and executes software 750 from storage system 740. Processing system may retrieve and store data 770. Processing system may also retrieve and store data via communication interface 720. Processing system 750 may create or modify software 750 or data 770 to achieve a tangible result. Processing system may control communication interface 720 or user interface 770 to achieve a tangible result. Processing system may retrieve and execute remotely stored software via communication interface 720.

Software 750 and remotely stored software may comprise an operating system, utilities, drivers, networking software, and other software typically executed by a computer system. Software 750 may comprise an application program, applet, firmware, or other form of machine-readable processing instructions typically executed by a computer system. When executed by processing system 730, software 750 or remotely stored software may direct computer system 700 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of determining a time-dependent influence of a rotating wind turbine blade on a surrounding gas flow field affecting the wake of said turbine blade, within an array of computational cells, using a computer system, comprising:
   determining a radial blade section of said turbine blade that lies within a chosen computational cell;
   determining an initial fluid flow vector representing the flow within said chosen computational cell at a beginning of a time step using said computer system;
   determining a force vector exerted on said radial blade section based on said initial fluid flow vector imparted by said gases of said gas flow field in said chosen computational cell on said radial blade section over a duration of said time step using initial upwind and downwind fluid flow vectors, a blade section velocity vector, and a blade section orientation; wherein said force vector imparted by said radial blade section on said gases in said chosen computational cell is determined using said computer system;
   determining an evolved fluid flow vector at an end of said time step from changes of said gas flow field imparted by said force vector of said radial blade section from said force vector using said computer system; and
   determining evolved upwind and downwind fluid flow vectors across said chosen computational cell from said force vector, and the difference therebetween, using said computer system.

2. The method of claim 1, wherein determining said force vector is further based on an angular velocity, instantaneous position, orientation, and surrounding flow field of said radial blade section.

3. The method of claim 1, wherein determining said evolved fluid flow vector is further based on a force that winds generate on said radial blade section of said turbine blade and pressure and forces imparted by said gases in said gas flow field.

4. The method of claim 1, wherein said evolved fluid flow vector is further based on a simulation time step, a volume of said computational cell, a mass of air within said computational cell, forces placed on air in said computational cell by air in adjacent cells, and gravity.

5. The method of claim 1, further comprising:
   determining a thrust of said turbine blade based on the force vector.

6. The method of claim 1, further comprising:
   determining a torque of said turbine blade based on the force vector.

* * * * *